United States Patent
Ota et al.

(10) Patent No.: US 6,446,523 B1
(45) Date of Patent: Sep. 10, 2002

(54) COMBINATION GEAR HAVING A GEAR SLIPPING-OFF PREVENTING STRUCTURE

(75) Inventors: Takashi Ota; Jun Togashi; Kiyoshi Morikawa; Hideki Kinoshita; Satoru Anada, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/544,566

(22) Filed: Apr. 6, 2000

(30) Foreign Application Priority Data

Apr. 8, 1999 (JP) .......................................... 11-100923

(51) Int. Cl.$^7$ .............................................. F16H 55/04
(52) U.S. Cl. ........................ 74/432; 74/413; 74/665 F; 403/353
(58) Field of Search ............................... 74/413, 665 E, 74/665 F, 665 S, 665 K, 745, 325, 405, 432, 447, 421 R, 439; 403/353, 354, 375, 380, 383; 474/161, 152

(56) References Cited

U.S. PATENT DOCUMENTS

| | | | | |
|---|---|---|---|---|
| 2,857,777 A | * | 10/1958 | Porter | 74/432 |
| 2,976,741 A | * | 3/1961 | Martin | 74/432 |
| 3,750,489 A | * | 8/1973 | Caldwell | 74/432 X |
| 3,831,459 A | * | 8/1974 | Satzler et al. | 74/439 |
| 4,416,650 A | * | 11/1983 | Wilkins | 474/161 |
| 4,646,877 A | * | 3/1987 | Hirose et al. | 74/432 |
| 5,363,714 A | * | 11/1994 | Hoguchi | 74/432 |
| 5,816,968 A | * | 10/1998 | Watson | 474/152 |

FOREIGN PATENT DOCUMENTS

JP  8-28660  * 2/1996 .................. 74/432

\* cited by examiner

*Primary Examiner*—David A. Bucci
*Assistant Examiner*—Colby Hansen
(74) *Attorney, Agent, or Firm*—Sughrue Mion, PLLC

(57) ABSTRACT

A combination gear having a gear slipping-off preventing structure with an easier combining operation is provided, which includes: a first gear having a shaft hole; a second gear, having a shaft hole, to coaxially couple with the first gear so as to constitute the combination gear; and a shaft to be inserted into the shaft holes of the respective first and second gears, wherein either one of the first and second gears is provided with a coupling male-portion having a securing projection and the other of the first and second gears is provided with a coupling female-portion having a securing recess so that the first and second gears combine together by coupling the coupling male-portion with the coupling female-portion with an engagement between the securing projection and the securing recess. And, a relief portion to permit a relief of an end portion of the securing projection on coupling the coupling male-portion with the coupling female-portion is also provided inside the securing recess.

4 Claims, 3 Drawing Sheets

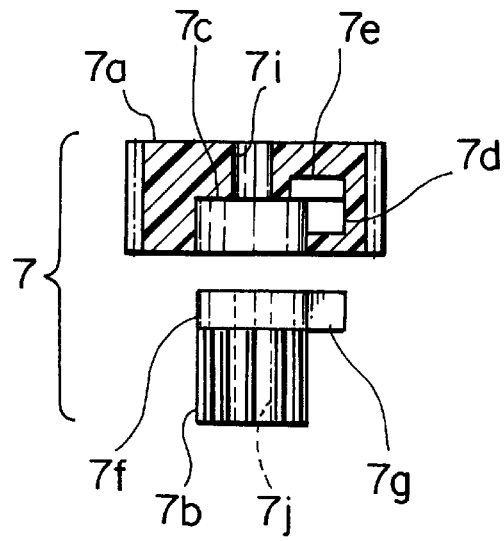
F I G. 1 A
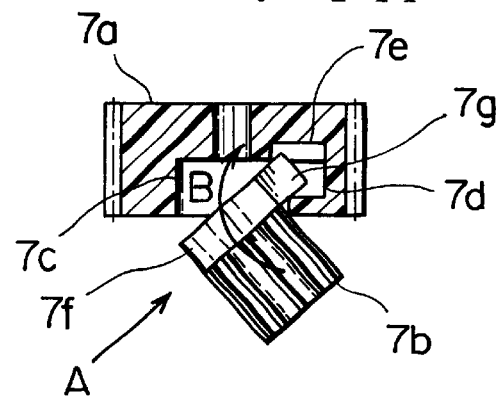
F I G. 1 B
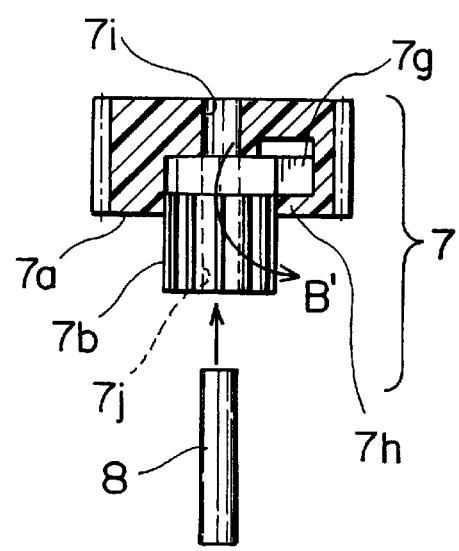
F I G. 1 C

COMBINATION GEAR HAVING A GEAR SLIPPING-OFF PREVENTING STRUCTURE

BACKGROUND OF THE INVENTION

1. Field of the Invention

The present invention generally relates to a combination gear, and more particularly, to a combination gear having a gear slipping-off preventing structure with an easier combining operation.

2. Description of the Related Art

A duplex gear (or two-stage gear) having a small gear portion and a large gear portion with a common shaft and integrally formed with the same material is known as a reduction gear to be used in a power transmission mechanism.

The small gear portion, however, of course has a smaller pitch circle diameter than that of the large gear portion. Accordingly, force to act on the small gear portion is large, and wear of the gear teeth of the small gear portion arises, especially in case material of the small gear portion is softer than that of the large gear portion.

FIG. 3 shows, for example, a part of a moving mechanism of a replaying portion of a disk in a disk changer. In this mechanism, transmission of power is carried out from a spur gear 2 made of resin to a large gear portion of a duplex gear 1. Next, power is transmitted from a small gear portion of the duplex gear 1 to a sector gear 3 made of metal. In this mechanism, a resin should be preferably used as a material of the duplex gear 1 from viewpoint of its cost. Form viewpoint of durability of the small gear portion to engage the sector gear 3 made of metal, however, the duplex gear 1 is made of metal. That is, the duplex gear 1 made of metal causes to increase weight of the gear mechanism, besides to increase the cost.

As is shown in FIG. 4, in order to improve the above, a duplex gear, namely a combination gear 4, consisting, separately, of a large gear 4a made of resin and a small gear 4b made of metal has been used, thereby attaining cost reduction and light-weighing.

This combination gear 4 has a coupling female-portion 4c of the large gear 4a and a coupling male-portion 4d of the small gear 4b as coupling portions. The combination gear 4 is formed by putting them together in an axial direction.

With respect to the combination gear 4, however, when the combination gear 4 is driven after the shaft 6 has been inserted therein, force to separate the combined small and large gears 4a,4b and arises its axial direction caused by backrush of the coupling male- and female-portions, which requires to provide a slipping-off preventing member 5 to hold the coupling of the combination gear 4 on the shaft 6, thereby preventing downsizing or thin-modeling of the gear mechanism.

SUMMARY OF THE INVENTION

In view of the foregoing, an object of the present invention is to provide a combination gear having a gear slipping-off preventing structure with an easier combining operation.

In order to achieve the above-described object, as a first aspect of the present invention, a combination. gear having a gear slipping-off preventing structure includes: a first gear having a shaft hole; a second gear, having a shaft hole, to coaxially couple with the first gear so as to constitute the combination gear; and a shaft to be inserted into the shaft holes of the respective first and second gears, wherein either one of the first and second gears is provided with a coupling male-portion having a securing projection and the other of the first and second gears is provided with a coupling female-portion having a securing recess so that the first and second gears combine together by coupling the coupling male-portion with the coupling female-portion with an engagement between the securing projection and the securing recess.

As a second aspect of the present invention, in the structure with the above first aspect, a relief portion to permit a relief of an end portion of the securing projection on coupling the coupling male-portion with the coupling female-portion is provided inside the securing recess.

As a third aspect of the present invention, a combination gear having a gear slipping-off preventing structure includes: a first gear having a shaft hole; a second gear, having a shaft hole, to coaxially couple with the first gear so as to is constitute the combination gear; and a shaft to be inserted into the shaft holes of the respective first and second gears, wherein either one of the first and second gears is provided with a coupling male-portion having a securing recess and the other of the first and second gears is provided with a coupling female-portion having a securing projection so that the first and second gears combine together by coupling the coupling male-portion with the coupling female-portion with an engagement between the securing projection and the securing recess.

As a fourth aspect of the present invention, in the structure with the above third aspect, a relief portion to permit a relief of an end portion of the securing projection on coupling the coupling male-portion with the coupling female-portion is provided inside the securing recess.

According to the above-described structure of the present invention, because the gears of the combination gear are engaged with each other in the axial direction, even if force, caused by the backrush between the coupling male- and female-portions, to separate the both gears arises in the axial direction, the coupling of the combination gear does not be released as long as the shaft is inserted therein. And, the combination gear of the present invention does not require any slipping-off preventing member on the shaft, thereby attaining reduction of parts and downsizing and thin-modeling of the combination gear itself.

And, because the relief recess is provided at the engaging portion, efficiency of the coupling work of the combination gear can be improved.

The above and other objects and features of the present invention will become more apparent from the following description taken in conjunction with the accompanying drawings.

BRIEF DESCRIPTION OF THE DRAWINGS

FIG. 1A a side view showing a state before coupling a combination gear of the present invention;

FIG. 1B is a side view showing a state of the coupling operation of the combination gear of FIG. 1A;

FIG. 1C is a side view showing a state of the coupling completion of the combination gear of FIG. 1B;

DESCRIPTION OF THE PREFERRED EMBODIMENTS

Embodiments of the present invention will now be described in further detail with reference to the accompanying drawings.

First, referring to FIGS. 1A,1B, and 1C, a basic structure and a combining operation of the combination gear in accordance with the present invention is described.

Figure 2:
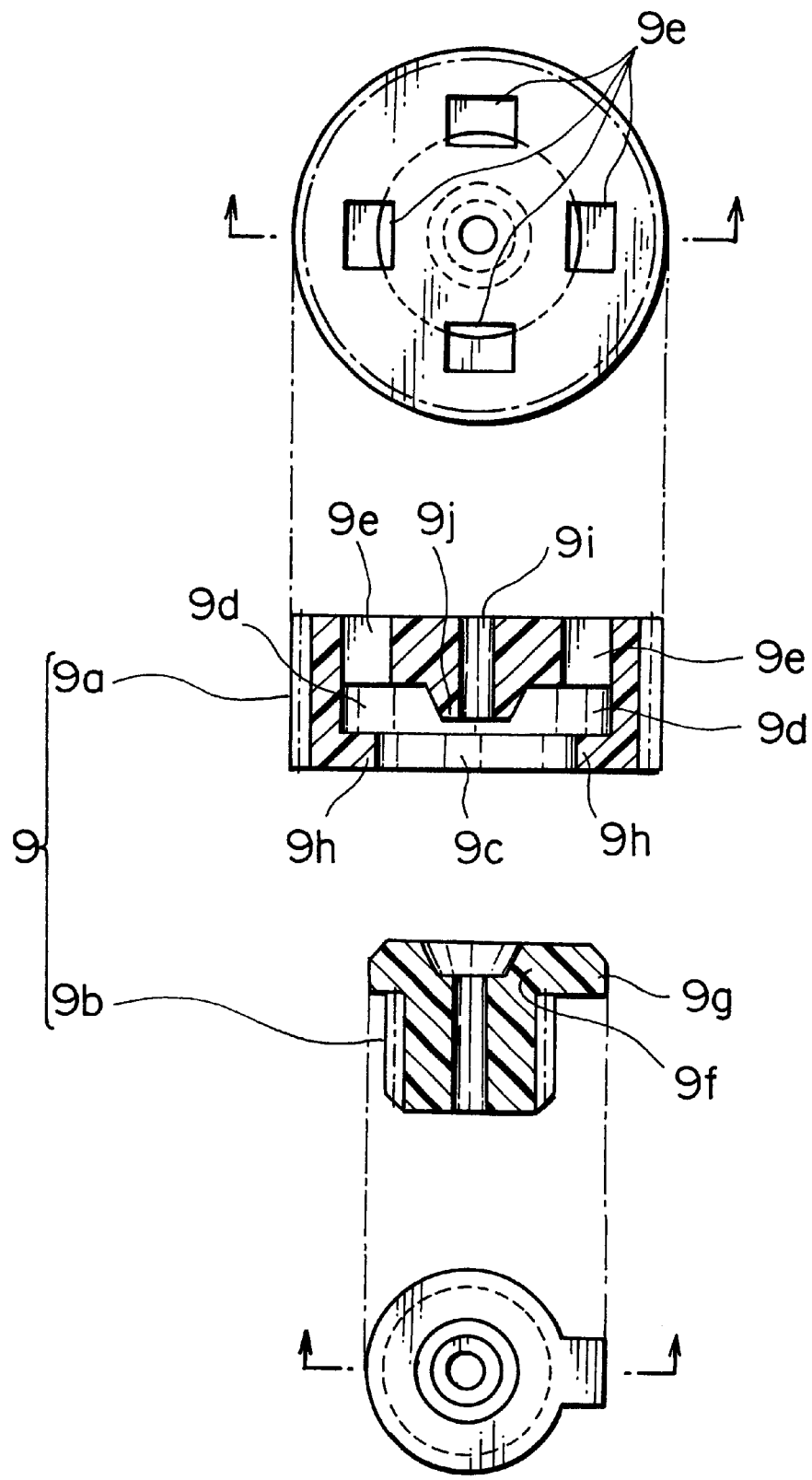
FIG. 2 is a sectional view and a front view both showing another embodiment of the combination gear of the present invention.
Figure 3:
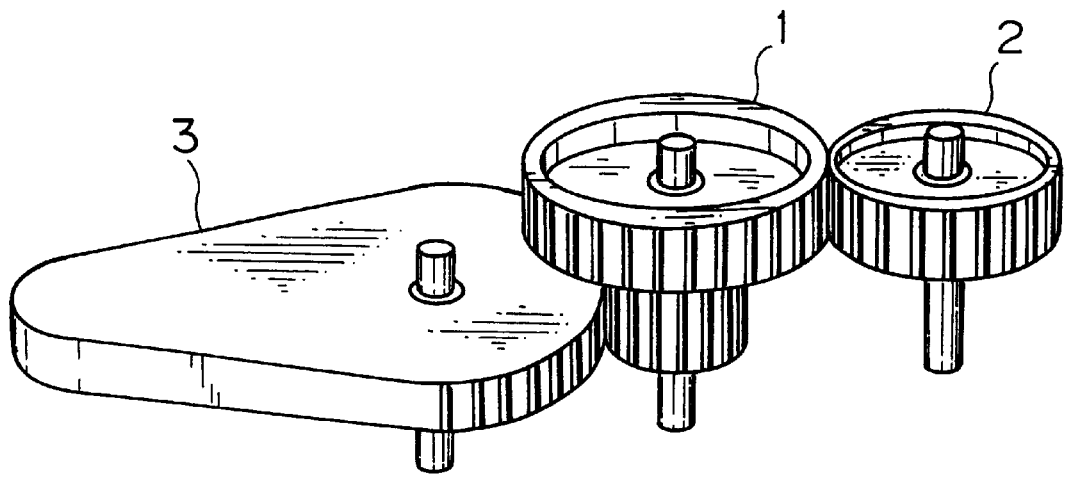
FIG. 3 is a perspective view showing a gear mechanism using a prior art duplex gear.
Figure 4:
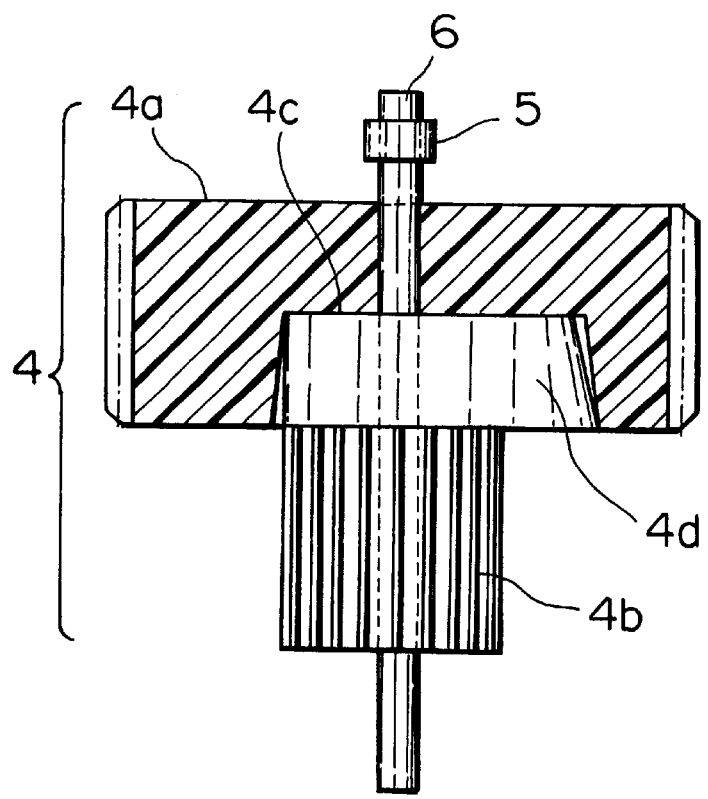
FIG. 4 is a side view showing a prior art combination gear.

Next, referring to FIG. 2, an application structure of the combination gear in accordance with the present invention is described.

As described above, first, referring to FIG. 1A, a basic structure of a combination gear 7 consisting of a small gear 7b and a large gear 7a is described. The small gear 7b has a coupling male-portion 7f to couple with the large gear 7a. The coupling male-portion 7f has a cylindrical shape with a shaft hole 7j in the center thereof and has a securing projection 7g on its periphery, which securing projection 7g has the same plane as the top surface of the coupling male-portion 7f. And, the large gear 7a has a coupling female-portion 7c to couple with the small gear 7b. The coupling female-portion 7c is of a cylindrical space around a shaft hole 7I and is provided with a securing recess 7d to couple with the securing projection 7g of the small gear 7b. The securing recess 7d continues from both of the peripheral wall and the top of the coupling female-portion 7c. The securing recess 7d receives the securing projection 7g and is provided with a relief recess 7e, i.e. a relief portion, in order to prevent the end of the securing projection 7g from coming into contact with an inner surface of the securing recess 7d when the securing projection 7g is inserted into the securing recess 7d.

Here, a combining operation of the large gear 7a and the small gear 7b is described, using FIGS. 1B and 1C.

First, the coupling male- and female-portions are to be faced each other as shown in FIG. 1A, and the securing projection 7g of the small gear 7b is obliquely inserted into the securing recess 7d of the large gear 7a as shown in FIG. 1B. And, the side surface of the small gear 7b is put into a state of abutment against the side surface of the coupling female-portion 7c. At this time, the end of the securing projection 7g enters the relief recess 7e provided inside the securing recess 7d. Following the above, the small gear 7b is turned about the abutting point as a fulcrum in the B-direction, and then the top surface of the coupling male-portion 7f abuts against the upper wall of the coupling female-portion 7c. By this, as shown in FIG. 1C, the shaft hole 7i of the large gear 7a is aligned with the shaft hole 7j of the small gear 7b on the same axis, and then the shaft 8 is inserted into the combination gear 7, thereby completing the combining operation.

By the shaft 8 inserted into the shaft hole, the small gear 7b can not be moved in the uncoupling direction (i.e. in a B' direction). That is, the large gear 7a and the small gear 7b do not come off each other. With this structure, even if force, caused by the backrush between the coupling male- and female-portions, to separate the both gears arises in the axial direction, the coupling of the combination gear 7 does not be released as long as the shaft 8 is inserted therein.

The combination gear 7 of the present invention does not require any slipping-off preventing member on the shaft 8, thereby attaining reduction of parts and downsizing and thin-modeling of the combination gear itself.

As is shown in FIG. 1C, the small gear 7b of the combination gear 7 of the present invention has the above securing projection 7g as an engaging portion to prevent the small gear 7b from being uncoupled from the large gear 7a in the axial direction. That is, this engaging portion abuts against an abutting portion 7h of the coupling female-portion 7c of the large gear 7a, and thereby an axial (i.e. the uncoupling direction) movement of the small gear 7b is checked.

Further, as shown in FIG. 1B, because the combination gear 7 of the present invention is provided with the relief recess 7e to prevent the end of the securing projection 7g form hitting the upper wall of the securing recess 7d when the securing projection 7g is inserted into the securing recess 7d, strong engagement can be obtained besides easier coupling work thereof.

Next, using FIG. 2, an application structure of the combination gear having the above-mentioned structure is described.

A combination gear 9 is of a duplex gear (or two-stage gear) integrally consisting of a large gear 9a and a small gear 9b having a coupling female-portion 9c and a coupling male-portion 9f, respectively. The coupling female-portion 9c is provided around a shaft hole 9i, and a bearing projection 9j is provided on the circumference of the shaft hole 9i at the upper wall of the coupling female-portion 9c, whereby a bearing portion having a length necessary for a stable movement is formed.

And, as shown also in FIG. 2, a securing projection 9g is provided on a side surface of the coupling male-portion 9f. And, a plurality of securing recesses 9d to receive the securing projection 9g, a plurality of relief recesses 9e as relief portions for the end of the securing projection 9g, and a plurality of abutting portions 9h to abut against the securing projection 9g are provided inside the coupling female-portion 9c. This structure can facilitate positioning of the securing projection 9g for the securing recess 9d, thereby improving efficiency of the coupling work of the combination gear.

According to the embodiments described hereinabove, because the gears of the combination gear are engaged with each other in the axial direction, even if force, caused by the backrush between the coupling male- and female-portions, to separate the both gears arises in the axial direction, the coupling- of the combination gear does not be released as long as the shaft is inserted therein. And, the combination gear of the present invention dose not require any slipping-off preventing member on the shaft, thereby attaining reduction of parts and downsizing and thin-modeling of the combination gear itself. And, because the relief recess is provided at the engaging portion, efficiency of the coupling work of the combination gear can be improved.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

For example, the present invention is applicable to a combination gear with a pair of gears having the same pitch circle or to a combination gear having three of more gears. And, material of gears may be of other than metal or resin. Further, the coupling male-portion, the coupling female-portion, the securing recess, and the securing projection may be provided on any one of the gears constituting the combination gear. Still further, though a duplex gear to be applied to a moving mechanism of a replaying portion of a disk in a disc changer is described hereinabove, use of the present structures may not be limited thereto.

What is claimed is:

1. A combination gear having a gear slipping-off preventing structure, comprising:

a first gear having a shaft hole;

a second gear, having a shaft hole, to coaxially couple with said first gear so as to constitute a combination gear; and a shaft to be inserted into said shaft holes of the respective first and second gears, such that said shaft contacts said first gear and said second gear, wherein either one of said first and second gears is provided with a coupling male-portion having a securing projection to prevent said either one of said first and second gears from slipping-off in a shaft inserting direction and the other of said first and second gears is provided with a coupling female-portion having a securing recess to engage with said securing projection, so that said first and second gears combine together by coupling said coupling male-portion with said coupling female-portion with an engagement between said securing projection and said securing recess, such that said shaft extends through said coupling female-portion.

2. The combination gear as set forth in claim 1, wherein a relief portion is provided near said securing recess which assists in the insertion of said securing projection into the securing recess.

3. The combination gear as set forth in claim 1, wherein said coupling female-portion is a recess including the securing recess and a relieving recess, wherein the relieving recess assists in the insertion of said securing projection into the securing recess.

4. A combination gear having a gear slipping-off preventing structure, comprising:

a first gear having a first shaft hole;

a second gear, having a second shaft hole, to coaxially couple with said first gear so as to constitute the combination gear; and a shaft to be inserted into said first and second shaft holes, such that said shaft contacts said first gear and said second gear;

wherein one of said first and second gears comprises a projection, extended in a direction perpendicular to a shaft insertion direction, to prevent said one of said first and second gears from slipping-off in the shaft insertion direction, and the other of said first and second gears comprises a recess to engage with said projection.

* * * * *